United States Patent [19]

Chernoff

[11] 4,233,606

[45] Nov. 11, 1980

[54] FREQUENCY TRANSLATING PHASE CONJUGATION CIRCUIT FOR ACTIVE RETRODIRECTIVE ANTENNA ARRAY

[76] Inventor: Alan M. Lovelace, Administrator of the National Aeronautics and Space Administration, with respect to an invention of Ralph C. Chernoff, Los Angeles, Calif.

[21] Appl. No.: 974,471

[22] Filed: Dec. 29, 1978

[51] Int. Cl.[3] .................................... H04B 7/00

[52] U.S. Cl. .................................... 343/100 TD

[58] Field of Search .................. 343/100 TD, 100 SA

[56] References Cited

U.S. PATENT DOCUMENTS 4,148,031 4/1979 Tausworthe et al. ........ 343/100 TD

*Primary Examiner*—Theodore M. Blum

*Attorney, Agent, or Firm*—Monte F. Mott; John R. Manning; Paul F. McCaul

[57] ABSTRACT

An active retrodirective antenna array having central phasing from a reference antenna element through a "tree" structured network of transmission lines utilizes a plurality of phase conjugate circuits (PCCs) at each node and a phase reference regeneration circuit (PRR) at each node except the initial node. Each node virtually coincides with an element of the array. A PCC generates the exact conjugate phase $\phi^*_1$ of an incident signal $\phi_1$ in accordance with the relation R $(2\phi_0-\phi_1)$ where R is equal to the reciprocal of 1-2/n, and $n \geqq 4$, using a phase locked loop which combines the phases $\phi_1$ and $\phi^*_1$ in an up-converter, divides the sum by 2 and mixes the result with the phase $\phi_0$ in a down-converter for phase detection by the phase $\phi^*_1$ from the loop oscillator divided by n. The PRR extracts the phase $\phi_0$ from the conjugate phase $\phi^*_1$ by mixing $\phi^*_1$ divided by 2 and divided by n in a down-converter and then mixing the phase $\phi_1$ divided by 4 with the result of the down-converter in two cascaded up-converters. Both the PCC and the PRR are not only exact but also free from mixer degeneracy.

14 Claims, 3 Drawing Figures

FREQUENCY TRANSLATING PHASE CONJUGATION CIRCUIT FOR ACTIVE RETRODIRECTIVE ANTENNA ARRAY

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to an active retrodirective array (ARA) antenna, and more particularly to a phase conjugation circuit which eliminates squint in a large ARA.

Systems employing retrodirective antennas receive and transmit (retrodirect) signals at different frequencies in order to provide input-output isolation. Such retrodirective antenna systems have been disclosed in repeaters for satellite communications systems. Representative of this prior art are patents to Margerum U.S. Pat. Nos. (3,300,782), Stahler (3,350,642), Preikschat et al (3,611,381), Raabe (3,757,334) and Albert (3,898,663). The problem with this prior art is that the phase conjugation circuits are not "exact" resulting in a pointing error known as "squint." The term "exact" as applied to phase conjugation is defined below.

In some applications it is necessary to retrodirect a narrow beam from a large antenna array on a satellite, and to continually steer the retrodirected beam to the center of a receiving antenna on the ground. Though not yet in practical use, ARA's are expected to become an important part of phased array technology. They have been proposed for such applications as satellite communication networks, aircraft transponders, and even for microwave powder transmission from an orbiting solar power station. The ARA steers a beam towards the apparent source of an illuminating signal called the pilot signal. In the case of communication satellites, for example, the pilot signal would be transmitted from a ground station with which the satellite communicates.

Much of the current interest in ARA's is centered about its possible application to a solar power satellite (SPS). The SPS would be placed in a geosynchronous orbit. Several gigawatts of microwave power, generated by and converted from the dc output of huge solar cell panels, would be transmitted to a rectifying antenna ("rectenna") on the Earth's surface. The SPS-rectenna range would be 36,000 km, the rectenna diameter 7.4 km, and the frequency S-band ($\lambda \approx 12.5$ cm). These parameters plus stringent sidelobe requirements imply a transmitting antenna on the SPS about 1.0 km in diameter. The pointing loss becomes unacceptable if the miss radius exceeds 200 m, which, in angular terms, corresponds to $5.6 \times 10^{-6}$ radians = 1.1 arc seconds. Because of the obvious difficulty in mechanically pointing a 1.0 km diameter antenna to this accuracy, the proponent of the SPS suggest using an ARA for the spacecraft antenna with the pilot source located at the center of the rectenna.

An equally important reason for using an ARA for the SPS is safety, specifically, the need to protect the public from exposure to the high power beam. Although no beam pointing system is infallible, the ARA would seem to be the most inherently reliable system for this application since its retrodirectivity is inseparable from the beam forming process itself. Such pointing errors that are known to exist produce only slight (compared to rectenna diameter) mispointing. Moreover, the response time of an ARA is determined by its own dimensions, not by the ground to spacecraft round trip delay as it would be for a conventional closed loop control system. It would, therefore, be of the order of microseconds, not $2 \times 36 \times 10^6/(3 \times 10^8) = 0.24$ seconds, the round trip delay for an SPS in geosynchronous orbit.

The applicability of ARA's to communication satellites has also been noted. Large antennas on communication satellites will be required not only to serve ground receivers with small apertures (as in direct TV transmissions), but also to provide the directivity needed for spectrum conservation. A communication satellite ARA could use either frequency or time division multiplexing. In a frequency multiplexed version designed to communicate with each of N ground station, each element of the array is equipped with N phase conjugation circuits, and each circuit responds only to the carrier frequency of the pilot signal transmitted by one of the N stations. Information modulated on the carrier of the pilot signal from one of the stations, call it Station A, is demodulated and remodulated onto the carriers of downlink signals retrodirected to one or more of the other ground stations. Similarly, information from any of these other stations can be simultaneously modulated onto the downlink to A. The average power available for each downlink must, of course, decrease with N, but the full gain of the array is available to each downlink independently of N.

If time division instead of frequency multiplexing is used, only one phase conjugation circuit and one receiver is required for each element. However, the bandwidth of that receiver must be N times greater than that of each of the N receivers required in the frequency multiplex case. Depending on the dimensions of the array, the required bandwidth, and the scan angles required to point beams at different ground stations, time delay compensation may be required in order to properly synchronize the data streams transmitted by the various elements.

ARA's may also be useful as deep space probe antennas. As the distance times data rate product increases, it will eventually become necessary to use spacecraft apertures too large to be mechanically pointed. Here, however, certain errors proportional to the velocity of the spacecraft relative to the ground station may become important. They are unimportant in geosynchronous satellites, such as the SPS and most communication satellites, because of their small relative velocities, but deep space probes may experience much higher velocities in the course of a mission, and this factor may limit the size of the ARA which can be used on such spacecraft.

It has been noted above that an ARA can function as a receiving array. Such arrays may be useful for receiving weak signals from very distant deep space probes or as radio astronomy arrays. Since low noise front ends are fairly expensive, such an array would probably consist of a modest number of fairly large antennas rather than a very large number of small elements. Each of the large elements would be mechanically steered to keep the source within its beamwidth. As in communication satellite ARA's, data processing may be required to remove time delay distortion.

An improved method and apparatus for an active retrodirective antenna which uses "central phasing" is disclosed in a copending application Ser. No. 777,983 filed Mar. 16, 1977. Before briefly summarizing the concept of "central phasing," a definition of terms and important principles will first be introduced.

An *active* retrodirective array (ARA) transmits a beam towards the apparent source of an illuminating signalcalled the pilot. "Active" implies that the array produces, not merely reflects, RF power. Retrodirectivity is achieved by retransmitting from each element of the array a signal whose phase is the "conjugate" of that received by the element. Assuming that the phase of the pilot signal of angular frequency $\omega$ received by the kth element of the array at time t is $$\phi_k(t)=\omega(t-r_k/c) \quad (1)$$

where $r_k$ is the distance from the kth element to the source of the pilot signal, we define the conjugate of $\phi_k$ to be $$\phi_k^*(t)=\omega'(t+r_k/c)+\theta_o \quad (2)$$

where $\omega'$ is the angular frequency of the conjugate signal, which in general is *not* the same as that of the pilot signal, and $\theta_o$ is an arbitrary phase offset which must, however, be constant over the entire array. In order to do this, each element of the array must be equipped with a phase conjugation circuit (PCC). The phase of the signal received from the kth element by a receiver located at the pilot source (4=o) is, at time t, $$\phi_k^*(t,o)=\omega'(t+r_k/c-r_k/c)+\theta_o=\omega't+\theta_o \quad (3)$$

Thus the contributions to the field at r=o from the various elements of the array are all in phase at that point, which means that the beam points toward the pilot source.

Previous definitions of phase conjugation included only the case $\omega'=\omega$. Here the definition is generalized in order to emphasize that $\omega'=\omega$ is neither necessary nor desirable; retrodirectivity holds in either case provided only that the propagation medium is non-dispersive, and $\omega'=\omega$ is usually to be avoided because of input-output isolation problems.

The term "exact conjugation" means that Equation (2) is satisifed exactly, rather than approximately. In a planar array (the most common geometry for antenna arrays) the effect of inexact conjugation is to misdirect (squint) the beam by an angle proportional to both the scan angle (the angle of incidence of the pilot signal) and the ratio $\omega'/\omega$. Thus, in applications requiring very precise beam pointing, phase conjugation for each array element must be exact to avoid squint. It is also evident that the phase conjugation circuit (PCC) design must avoid any "mixer degeneracy" which may cause large unpredictable phase errors. Prior art phase conjugators which shift the received signal frequency in generating a conjugate signal do so in a manner which results in inexact phase conjugation.

"Mixer degeneracy" refers to either of two cases: a down-converter in which the frequency of one of the inputs is twice that of the other, or an up-converter with equal input frequencies. In either case the output signal contains two components with distinct phases. Only one of these components has, in general, the correct phase, but due to their common frequency, the two components are indistinguishable. Hence a phase error is produced of a magnitude that depends upon the vector sum of the two components.

An ARA can also function as a receiving (i.e:, tracking) array. It is easy to show how a single PCC at each element can be used for both functions, receiving as well as transmitting, simultaneously, with little additional equipment.

From Equations (1) and (2) it is seen that phase conjugation amounts to advancing the phase of an input signal by an amount equal to its delay. The phase conjugation circuit (PCC) must, therefore, be provided with a phase reference against which to measure that delay. If each PCC is located at its associated ARA element, then it is clear that the phase reference must be transmitted to each PCC from some central source via transmission lines of equal phase delay modulo $2\pi$. But it may be difficult to do this if the transmission lines are very long. For example, consider the 1.0 km diameter SPS ARA described above operating at S-band ($\lambda=12.5$ cm). If the master phase reference is located at the center of the disk, the transmission lines to elements at the periphery will be 500 m long. In order to keep the phase delay in this line constant to within $\pi/10$ radians, its length must not vary by more than $\pm\lambda/20$ cm, or a relative change no greater than $\pm1.2\times10^{-5}$. But this length change would be produced in an aluminum line by a temperature change of only 0.5 degrees C, or by a mechanical stress of only 120 psi. The results for other good conductors are similar. Since it is reasonable to expect temperature and stress changes far greater than these in this huge structure, it is clear that the required dimensional stability cannot be met with materials commonly used for transmission lines.

While it might be possible to solve this problem with uncommon materials, it is possible to avoid it altogether by locating all PCC's at the reference source rather than at their respective elements. This method of providing the phase reference is referred to above as "central phasing" and will be described more fully hereinafter. The phase reference for this ARA is the pilot signal received by the 0-th, or reference, element. The pilot signal received by the kth element is transmitted to its associated PCC located at the reference element via a transmission line and diplexer. The PCC conjugates the *entire* phase delay, i.e. the sum of the space delay, $\omega r_k/c$, and the transmission line delay, $\omega l_{ko}/c_L$, where $c_L$ is the phase velocity of the line, and transmits that conjugate signal back down the *same* transmission line to the kth element, which retransmits it. Its phase at that point is $\omega'(t+r_k/c)+\theta_o$ which is exactly what it would be were the PCC located at the kth element rather than at the reference element. Thus the length of the transmission line is immaterial provided only that: first the line is dispersionless, and second its length is constant with time.

The importance of central phasing lies in the fact that it liberates the ARA from the rigid structure which would otherwise be needed in order to realize accurate retrodirectivity. The elements need not be arranged in any particular geometrical pattern, and may, in fact, move about with respect to one another provided the movement is not too rapid. This applies, of course, only to pointing accuracy, not to side lobe levels or other characteristics of the antenna array.

Locating all the PCC's in one small volume very near the reference element may be difficult if the array contains thousands of elements. A modification of the central phasing concept using a tree topology (in which the phase reference is regenerated at each node and which will be required in such large arrays) is disclosed in the aforesaid application. Each branch of the tree consists of a PCC, located near the node, and an element of the ARA at the end of a transmission line. A phase reference supplies all the PCC's connected to a node. At the initial node, this is the reference element of the array. At subsequent nodes, it is a phase reference regenerator (PRR). The PRR combines samples of the pilot and conjugate signals at an element to reproduce the original reference. Since the signal paths within these nodes assemblies are unilateral, their phase delays must be carefully balanced in order to avoid phase error buildup at successive nodes. In order to assure the stability of the phase delay balance, these assemblies must be uniform and compact. Critical applications may require temperature stabilization of some active elements.

The number of nodes in a tree is relatively small even for an ARA of several thousand elements. For example, with six branches at each node, a tree of only five nodes suffices for an array of 9331 elements. PRRs are required only at the first through fourth order nodes of this tree. A PRR at a fourth order node is the last in a chain of four PRRs connecting the PCCs at that fourth order node to the reference elements of the ARA. The error in the value of the phase reference produced by this last PRR is the sum of the errors arising in all the PRR's in the chain. If these errors arise from independent and identical random processes in each PRR, then the probable error of the output of the last PRR is $\sqrt{4(PE)^2}=2$ (PE) where PE is the probable error of each PRR. Thus the error buildup due to repeated regeneration of the phase reference is moderate even for large arrays.

SUMMARY OF THE INVENTION

An active retrodirective antenna array has central phasing from a reference antenna element through "tree" structured network of transmission lines to electronically point a microwave beam to the apparent source of a incident beam using a new phase conjugation circuit (PCC) and a new phase reference regeneration circuit (PRR) in each branch. Each PCC is connected at a node which, in the case of the node located at the reference element, receives the reference phase, $\phi_o$, from the reference element directly, and in the case of other nodes located at other antenna elements, from a PRR in a node assembly at the element. The PRR extracts the reference phase from the conjugate phase at the node of another plurality of PCCs, each of which is connected to antenna elements by a transmission line. The PCC generates the conjugate phase $\phi_1^*$ of an incident signal $\phi_1$ in accordance with the relation $R(2\phi_o-\phi_1)$ where R is equal to the reciprocal of 1-2/n, and $n\geqq 4$, using a phase locked loop. The VCO of the loop is controlled by a phase detector whose phase inputs are $\frac{1}{2}(\phi_1^*+\phi_1)-\phi_o$ and $\phi_1^*/n$ respectively, where phase $\phi_1^*$ is the phase of the VCO output. That phase $\phi_1^*$ is also the phase conjugate of phase $\phi_1$ can be seen by equating the phase detector inputs and solving for $\phi_1^*$.

A PRR regenerates the phase $\phi_o$ from a conjugate $\phi_1^*$ by first mixing $\phi_1^*/2$ and $\phi_1^*/n$ in a down-converter to obtain $\phi_o-\phi_1/2$, and mixing an up-converter with $\phi_1/4$. The phase sum of that up-converter is then mixed with $\phi_1/4$ in an up-converter to regenerate the phase $\phi_o$.

DESCRIPTION OF PREFERRED EMBODIMENTS

Figure 1:
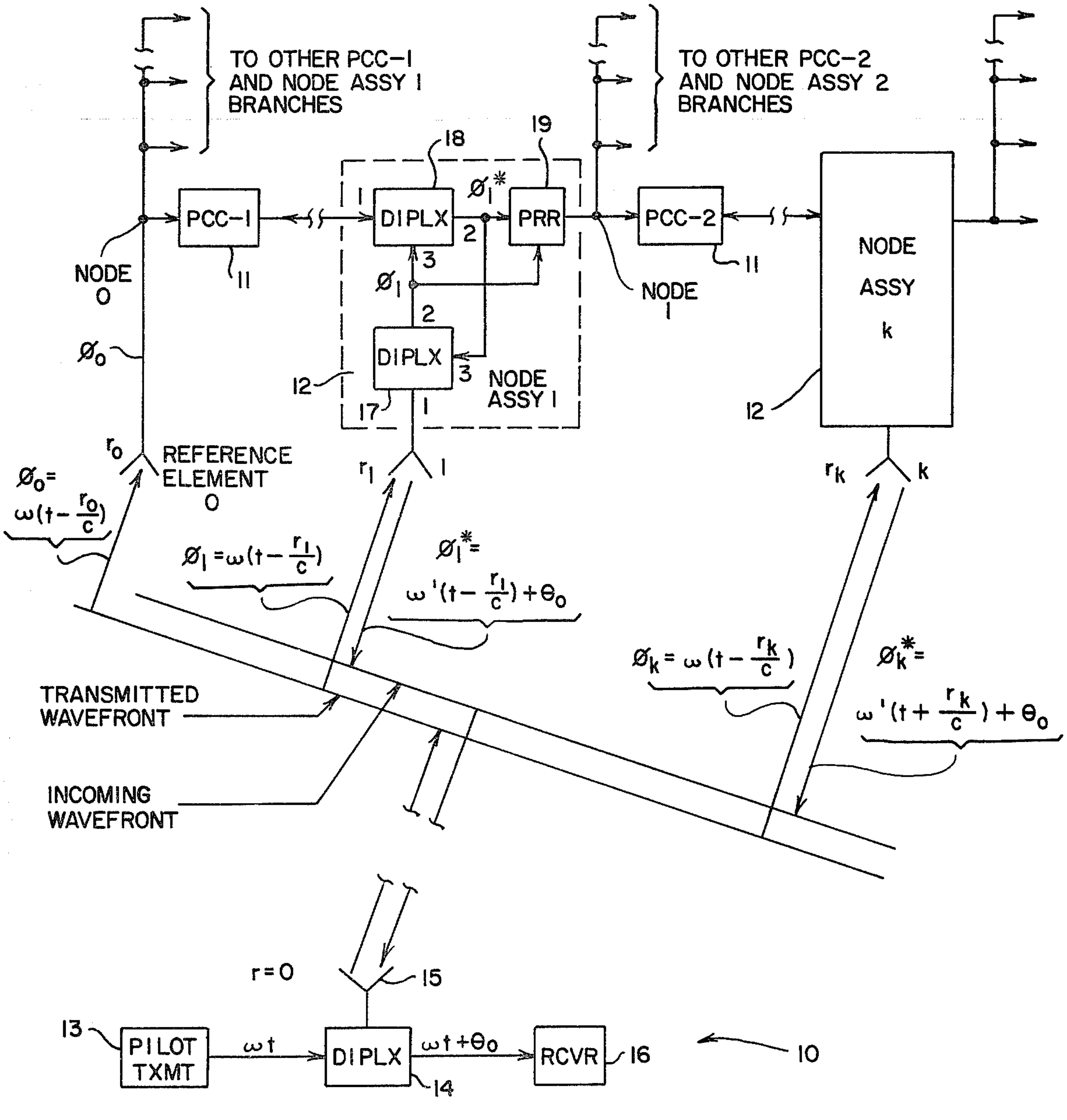
FIG. 1 illustrates a tree structure for a centrally phased ARA as shown in the aforesaid patent application.

Referring now to FIG. 1, there is disclosed an active retrodirective array (ARA) of the centrally phased type using a tree structure to distribute a reference phase $\phi_o$ from one of many antenna elements 0, 1, . . . k . . . to phase conjugation circuits (PCCs) for all elements of the array. Retrodirectivity is achieved by retransmitting from each element of the array a signal whose phase is the conjugate $\phi_k^*$ of the phase $\phi_k$ received by the kth element, as described generally with reference to Equations (1), (2) and (3). From that general description it is seen that the phase of a pilot signal received at time t by the kth element of the array may be expressed as $\omega(t-r_k/c)$ where $\omega$ is the radian frequency of the pilot signal, $r_k$ is the distance from the pilot source 10 to the kth element, and c is the phase velocity in the intervening medium. Phase conjugation may be expressed as the operation:

$$\omega(t-r_k/c)\rightarrow\omega'(t+r_k/c)+\theta_o \quad (4)$$

where $\theta_o$ is the constant phase offset determined by $\phi_o$. A phase conjugation circuit (PCC) 11 is associated with each element of the array to perform this operation with the same phase reference $\phi_o$ for all elements 1 . . . k . . . .

Thus, in accordance with the central phasing concept of the aforesaid application, the pilot signal received by one of the elements, 0, called the reference element, is used to generate the phase reference $\phi_o$. The phase conjugation circuit PCC-1 associated with the first antenna element 1 is located at, i.e. is electrically close to, this reference element 0. The phase conjugation circuit PCC-2 for the element 2 is located at the first element 1, and so forth to the kth element and beyond to the end of the array.

Each phase conjugation circuit is connected to its associated element by a non-dispersive transmission line. The box 11 labeled NODE ASSY 1 is an assembly that contains all the circuits located close to antenna element 1 including the phase conjugation circuit for antenna element 2 (not shown). Each node assembly contains such diplexing apparatus DIPLX as is necessary to couple signals into and out of the transmission lines and a phase reference regenerator (PRR) to provide the reference $\phi_o$ to each of a plurality of PCCs each of which is connected to a NODE 1 and is labeled PCC-2 because it is connected to an array element in a second level of the tree structure. From this it is apparent that the reference element 0 is connected to a plurality of PCCs (each labeled PCC-1) at a NODE 0, each PCC-1 being connected to an element 1 through a node assembly which in turn has a plurality of PCCs (each labeled PCC-2) connected to a NODE 1. Each PCC-2 at this level is connected to an element 2 (not shown) at the next level through a node assembly. The tree structure is extended until each element of the array is connected to a node assembly. This tree structure thus references all PCCs to the element 0 either directly (as for a PCC-1 shown) or indirectly (as for a PCC-2 shown).

By locating the phase conjugation circuit PCC-1 for the first element 1 at the node 0, the phase of the conjugated signal transmitted from the first element 1 is independent of the phase delay of the transmission line between the node assembly for the first element 1 (i.e., NODE ASSY 1) and its phase conjugation circuit PCC-1. If the transmission line phase delay is $\omega t_{10}$, then the phase of the input to PCC-1 is $\omega(t-t_1-t_{10})$. Therefore, by our definition of phase conjugation above, the phase of the output of PCC-1 is $\omega'(t+t_1+t_{10})+\theta_o$. This signal is retransmitted down the same transmission line to element 1. Since the line is non-dispersive, the retransmission phase delay exactly cancels the $+\omega' t_{10}$ term in the conjugated signal. Thus, the phase of the signal transmitted by the first element 1 is $\phi'(t+t_1)+\theta_o$, which is exactly what it would be if the first phase conjugation circuit PCC-1 were located at the first element 1 instead of the zeroth element and supplied with the correct phase reference.

Moving on to an element 2 (not shown) at the next level, in order for the phase conjugation circuit PCC-2 to conjugate the phase of the pilot signal received by the second element via its node assembly, that phase conjugation circuit PCC-2 must be supplied with exactly the same phase reference as was the first element's phase conjugation circuit PCC-1. That phase reference is contained in the conjugate signal returned to the first element as the phase offset $\theta_o$. In order to extract this reference $\phi_o$, the conjugate signal is combined with the pilot signal in a phase reference regenerator which supplies the phase reference to the phase conjugation circuits for the second level of elements. In the same way, the phase reference regenerator at each second level element supplies the phase reference to the third level phase conjugation circuit PCC-3 and so on. Since each phase conjugation circuit receives the correct phase reference, $\phi_o$, it can conjugate the pilot signal received by its associated element correctly. Moreover, as in the case of the first level elements, the accuracy of phase conjugation at any element is independent of the phase delay of the transmission line between that element and its associated phase conjugation circuit.

What has been described is a two-dimensional array of antenna elements connected in a tree configuration. In the "tree" analogy, the zeroth element is at the trunk (NODE 0) with several branches issuing from it. The two-dimensional arrangement is indicated in FIG. 1 by the arrows pointing to other PCCs fed in parallel by the NODE 0, and by each phase reference regenerator (PRR) in subsequent node assemblies. For a reasonable number of branches, the number of successive node assemblies required to connect all the elements of a large array is not large. As noted hereinbefore, if there are six branches at each node, then a tree with six levels of nodes connects 9,331 elements. The path from the reference element to any other element k in such an array intersects at most four phase reference regenerators. Thus, assuming each PCC independently contributes a uniform RMS phase error $\sigma(\phi)$, then the RMS cumulative phase error is a modest $4\sigma(\phi)$.

At the pilot source 10, a pilot transmitter 13 transmits a signal of angular frequency $\omega$ via a diplexer 14 and antenna 15, and a receiver 16 receives a signal of angular frequency $\omega'$ via the antenna and diplexer, where $\omega'$ is the angular frequency of the conjugate signal retrodirected from the antenna array. The received phase $\theta_o$ is an arbitrary phase offset which must, however, be constant over the entire array, as noted hereinbefore. That is assured by the PCC associated with each array element. Before describing the organization and operation of each PCC with reference to FIG. 2, attention is again directed to the fact that the reference element 0 is connected at NODE 0 to each of the first level of PCCs designated PCC-1. A typical PCC of the first level receives the pilot signal of phase $\phi_1$ and transmits the conjugate signal of phase $\phi_1^*$ through diplexers 17 and 18 of the node assembly to which the PCC is connected. Other PCCs at the same level will receive the pilot signal with a phase dependent upon its own position in the array. The two diplexers also feed a phase reference regenerator 19 which in turn feeds the phase reference $\phi_o$ to the next level of PCCs. It should be noted that each PCC is associated with (belongs to) a separate node assembly.

A diplexer is a reciprocal 3-port frequency electronic device which, in this application, works as follows. The signal of one frequency incident on port 1 is coupled to port 2, but not to port 3. Simultaneously, a signal at a different frequency incident on port 3 is coupled to port 1, but not to port 2. The purpose of the diplexer 17 is to allow a single antenna element to be used both for receiving the pilot signal from, and transmitting its conjugate to, the station from which the pilot signal emanated. The purpose of the diplexer 18 is to allow a single transmission line to be used to receive the phase conjugate $\phi_1^*$ from a remote PCC and to transmit the signal received from the array element to the PCC for that remote array element. The phase reference regenerator (PRR) 19 receives both the signal $\phi_1$ and its phase conjugate $\phi_1^*$ to regenerate from the two signals the reference signal $\phi_o$ which is fed to all PCCs of the next level connected to that node assembly. A preferred PRR will be described with reference to FIG. 3.

Figure 2:
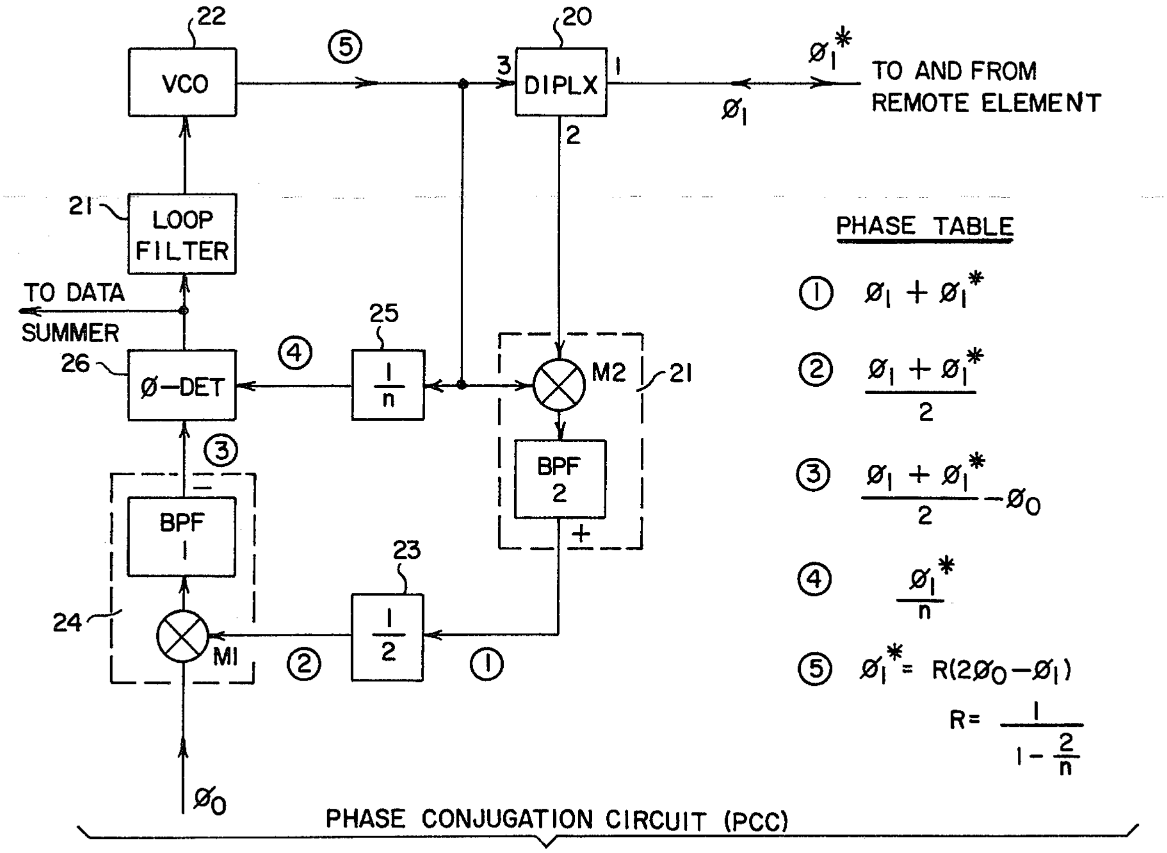
FIG. 2 illustrates an improved PCC for the ARA of FIG. 1.

Referring now to FIG. 2, the phase conjugation circuit (PCC) shown is assumed to be a PCC-1 located at the NODE 0 of the tree structure shown in FIG. 1, but it could be a PCC at any level of the tree structure. It is connected to its associated antenna array element by the transmission line connected to port 1 of a diplexer 20. It receives the pilot signal, whose phase is $\phi_1$, from that remote array element via that transmission line, and transmits the conjugate of that pilot signal (phase $=\phi_1^*$) via that same transmission line back to that array element. It receives the phase reference signal (phase $=\phi_o$) either directly or indirectly from the reference array element (labeled 0 in FIG. 1) of the array; directly if the PCC is located at NODE 0 connected to the reference element (e.g. PCC-1 in FIG. 1), indirectly (via a phase reference regenerator) if located at any of the lower echelon node assemblies (e.g. PCC-2).

The pilot signal coupled out of port 2 of the diplexer is mixed in up-converter 21 comprised of a mixer M2 and bandpass filter BPF2, with a sample of voltage controlled oscillator (VCO) 22 output. The output of a mixer consists mainly of two components whose frequency and phase are equal to the sum and difference respectively of that of the inputs. The term "up-converter" implies the presence of a bandpass filter at the output of mixer M2 to pass the sum frequency while blocking the difference. This sum component, whose phase equals $\phi_1+\phi_1^*$ as indicated at ① in the Phase Table, is fed to a "divide-by-2" circuit 23 whose phase is half that of its input, as indicated by ② in the Phase Table in FIG. 2. The Phase Table indicates only the phase at designated points in the PCC because: the invention concerns the operation of a *phase* conjugator; and the frequency f of each signal is given by the same expression with f instead of $\phi$; e.g. the frequency at ② is $(f_1+f_1^*)/2$. For this reason there is no need to use the "$f\angle\phi$" notation frequency seen in the literature.

The divide-by-2 circuit is usually a flip-flop. Its output is mixed with the phase reference signal in a down-converter 24 comprised of a mixer M1 and bandpass filter BPF1. The output of mixer M1 is the difference frequency and phase of the two inputs. (See ③ in the Phase Table of FIG. 2).

A sample of the VCO output is also fed to a "divide-by-n" circuit 25 where n is an integer $\geqq 4$. This circuit is commonly made up of several flip-flops appropriately interconnected. As its name indicates, this circuit divides both the frequency and phase of its input by n. The outputs of the divide-by-n circuit and down-converter 24 are then fed to a phase detector 26 whose output is passed through a loop filter 27 (a low pass filter which may include a dc amplifier to increase loop gain) to provide the feedback control signal for the VCO. In steady state operation of the phase locked loop, the two input signals to the phase detector must have the same frequency and phase, i.e. ③ and ④ of the Phase Table must be equal. Solving that equation for $\phi_1^*$ gives $$\phi_1^* = R\,(2\phi_0 - \phi_1) = R\omega\,(t + \frac{r_1 - 2r_0}{c}) \quad (5)$$

$$\text{where } R = \frac{1}{1 - \frac{2}{n}}.$$

Since $\phi_o$ is the same for all the elements of the array, so is the phase offset $\theta_o=2R\phi_o$. Hence $\phi_1^*$ is the exact phase conjugate of $\phi_1$ according to the definition given by Eq. (2) above. R is the frequency translation ratio. Since $n\geqq 4$, it follows that $1<R\leqq 2$.

The $n\geqq 4$ condition is necessary to avoid "degenerate" operation of mixer M1; if n=3 the frequency at the 2 input to M1 is twice that of the reference signal, so that M1's lower sideband (difference frequency) output is equal to that of its reference signal input. This condition is to be avoided. For n=1 or 2 the circuit does not conjugate at all.

This new PCC lends itself very well for use in a receiving array. All that would be needed is a clean-up loop between the reference element and the PCC-1s at NODE 0, so that the reference signal applied to these PCCs contains only the carrier phase, $\omega(t-r_o/c)$, and no modulation. The phase detector 26 then serves as a demodulator whose output is fed to the data summer (through a delay distortion correcting processor if required) along with the data from the other PCC's.

The new phase conjugate circuit thus receives a pilot signal at one frequency, f, and retrodirects a signal at a different frequency, f*, in order to provide input-output isolation. The different frequency is in exact phase conjugation, thus avoiding any "squint", and without mixer "degeneracy", which may cause large unpredictable phase errors. This advantage of avoiding mixer degeneracy distinguishes this new phase conjugate circuit from one of the PCCs disclosed in the aforesaid patent application in FIG. 4. In FIG. 2 of this application, both mixers, M1 and M2, are *non*-degenerate.

Figure 3:
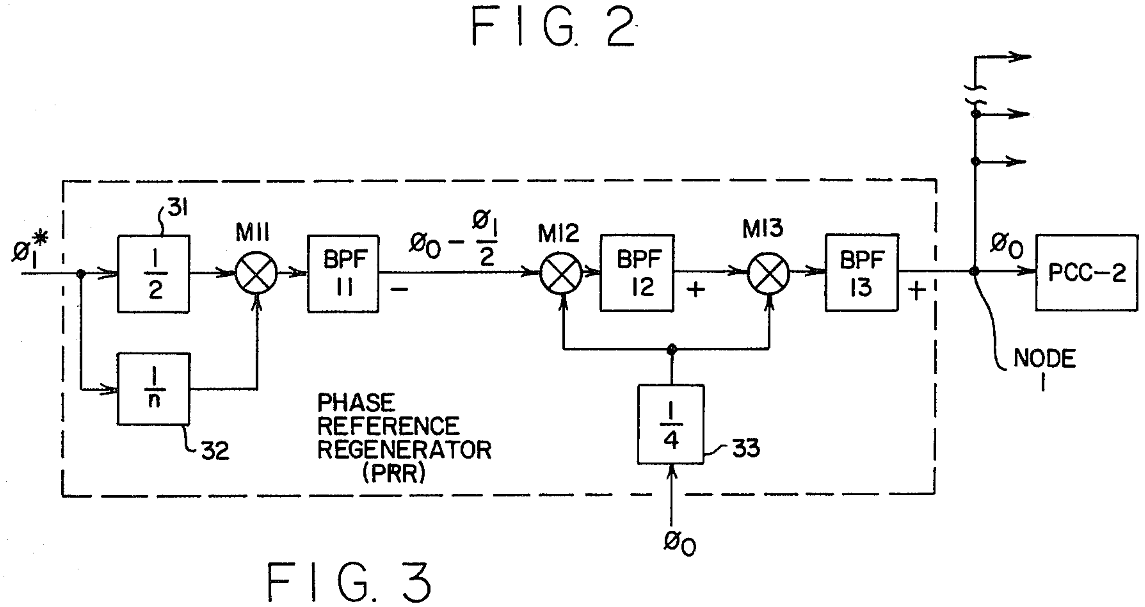
FIG. 3 illustrates an exemplary embodiment of a PRR for the ARA of FIG. 1.

The phase reference regenerator 19 of FIG. 1 may be implemented as shown in FIG. 3. This circuit avoids the mixer degeneracy problem which afflict the analogous circuits in the aforesaid application. It employs a most straight forward approach in recovering the phase reference $\phi_o$ by the proper combination of the conjugate, $\phi_1^*=R(2\phi_o-\phi_1)$, and the pilot signal, $\phi_1$, using three mixers M11, M12 and M13, instead of two because two signals of the same frequency can not be added in a single mixer without incurring degeneracy. The upper sideband would have the same frequency as the second harmonic of the strong signal if a single mixer were used. Instead the pilot signal is added to the output of mixer M11 in two stages, M12, and M13, in order to remove this "degeneracy." The first mixer M11 is part of a down-converter which includes a bandpass filter BPF11 for the difference between the reference $\phi_o$ and $\phi_1$ divided by two using a "divide-by-2" circuit 31 and a "divide-by-n" circuit 32 to obtain the two inputs to the mixer M11. The bandpass filter BPF11 is tuned to the difference $\phi_o-\frac{1}{2}\phi_1$. The pilot signal $\phi_1$ divided by 4 in a circuit 33 is applied as a second input to the mixers M12 and M13 which are part of up-converters that include bandpass filters BPF12 and BPF13. One half of the phase $\frac{1}{2}\phi_1$ is added to the input of the mixer M12 and one half of the phase $\frac{1}{2}\phi_1$ is added in the second mixer, thus adding $\frac{1}{2}\phi_1$ to the output of the bandpass filter BPF11 to produce the exact reference $\phi_o$.

While this phase reference regeneration circuit is described for extracting the phase reference to be used in the next PCC at the second level, it should be apparent that the circuit may be used for any level of PCCs. The PCC circuit disclosed may also be used at any level of the tree structure for centrally phased active retrodirective arrays.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In an active retrodirective array of antenna elements, a separate frequency shifting phase conjugation means associated with and coupled to each element by a transmission line for receiving a signal of phase $\phi_1$ from the associated element over said transmission line and transmitting to the associated element a signal of conjugate phase $\phi_1^*$ equal to $R(2\phi_o-\phi_1)$ where $\phi_o$ is a signal of reference phase from a chosen element of said array, R is the reciprocal of 1-2/n and n is an integer equal to or greater than 4.

2. In an active retrodirective array as defined in claim 1, a phase reference regeneration means at said associated element for regenerating from said conjugate phase $\phi_1^*=R(2\phi_o-\phi_1)$, and said signal of phase $\phi_1$ from said associated element, a signal of reference phase 100 $_o$ to be applied to another phase conjugation means associated with and coupled to another element by transmission line.

3. In an active retrodirective array, the improvement as defined in claim 2 wherein said phase reference regeneration means is comprised of separate means for dividing said conjugate phase signal by 2 and by n to obtain signals of phase $\phi_1^*/2$ and $\phi_1^*/n$, means for combining said signals of phase $\phi_1^*/2$ and $\phi_1^*/n$ to obtain a signal of a phase $\phi_o - \frac{1}{2}\phi_1$ that is the difference of said signals combined, means for dividing said signal of phase $\phi_1$ by 4 to obtain a quotient signal of phase $\frac{1}{4}\phi_1$, and means for combining the quotient signal with said signal of phase $\phi_0 - \frac{1}{2}\phi_1$ twice in cascaded stages to obtain the successive sum signals $\phi_0 - \frac{1}{2}\phi_1$ and $\phi_0$.

4. In an active retrodirective array of antenna elements for transmitting a beam at one frequency in the direction of an incident signal of a source operating at a different frequency, wherein a chosen one of said elements is selected as a reference for generating the conjugate phase of the signal phase received by each of the other elements, and where the other elements are divided into a plurality of elements, the improvement comprising

- a first plurality of separate means associated with each of a number of said antenna elements of a first group, each connected to receive a signal directly from said reference element as a phase reference, $\phi_0$, and to receive a signal from an associated element of an incident phase $\phi_1$ for generating a signal transmitted to the associated element of conjugate phase $\phi^*_1$ equal to $R(2\phi_0 - \phi_1)$, where R is equal to the reciprocal of 1-2/n and $n \geqq 4$, and
- a second plurality separate means connected to each phase conjugate generating means by a separate transmission line for extracting from the conjugate phase $\phi^*_1$ the reference phase $\phi_0$ and applying the regenerated reference phase to a second plurality of phase conjugate generating means associated with each of a number of said antenna elements of a second group, each of said second plurality of phase conjugate generating means being identical to corresponding means of said first group of antenna elements.

5. The improvement as defined in claim 4 wherein each of said first plurality of phase conjugate generating means is comprised of a voltage controlled oscillator, first means for mixing said incident phase $\phi_1$ with said conjugate phase $\phi^*_1$ to obtain a summed phase $\phi_1 + \phi^*_1$ divided by two, and second means for mixing said converted phase with said reference phase to obtain a differenced phase of the mixed phases, means for detecting said differenced phase with the output of said oscillator divided by said integer n, and means for loop filtering the output of said detection means to obtain a control voltage for said oscillator, whereby said oscillator produces a signal with a conjugate phase $\phi^*_1$ of said incident signal $\phi_1$.

6. The improvement defined by claim 5 including means for coupling said incident signal of phase $\phi_1$ transmitted over a transmission line from said associated antenna element to said first mixing means, and for coupling said signal of conjugate phase $\phi^*_1$ from said oscillator to said associated antenna element over said transmission line.

7. The improvement of claim 6 wherein said means for extracting from the conjugate phase $\phi^*_1$ the reference phase $\phi_0$ is comprised of means for obtaining the difference between phase $\phi^*_1$ divided by two and phase $\phi^*_1$ divided by said integer n, thereby producing a signal of phase $\phi_0 - \frac{1}{2}\phi_1$ to obtain the phase $\phi_0$.

8. The improvement of claim 7 wherein said last named means is comprised of means for dividing the signal phase $\phi_1$ by 4 to obtain the phase $\frac{1}{4}\phi_1$, and first and second mixing means connected to receive said signal of phase $\phi_0 - \frac{1}{2}\phi_1$ in cascade and to mix said signal phase $\frac{1}{4}\phi_1$ at each stage for a total addition of $\frac{1}{2}\phi_1$.

9. A phase conjugation circuit for receiving an incident signal of phase $\phi_0$ from an element of an antenna array and an incident signal of phase $\phi_1$ from another element of an array antenna, and producing a signal of conjugate phase $\phi^*_1$ equal to $R(2\phi_0 - \phi_1)$, where R is equal to the reciprocal of 1-2/n and $n \geqq 4$, comprising

- a voltage controlled oscillator for producing said signal of phase $\phi^*_1$
- means for combining the output of said oscillator and said signal of phase $\phi_1$ to obtain a signal of phase $\phi_1 + \phi^*_1$,
- means for dividing said signal of phase $\phi_1 + \phi^*_1$ by two, to obtain a signal of phase $\frac{1}{2}(\phi_1 + \phi^*_1)$,
- means for combining said signal of phase $\phi_0$ with the output of said means for dividing by two to obtain a signal of a phase difference $\frac{1}{2}(\phi_1 + \phi^*_1) - \phi_0$
- means for phase detecting said signal of phase difference $\frac{1}{2}(\phi_1 + \phi^*_1) - \phi_0$ with the output of said oscillator divided by n, and
- means for loop filtering the output of said phase detector to obtain a control signal for said voltage control oscillator, whereby said oscillator produces said phase conjugate signal $\phi^*_1$.

10. A circuit as defined in claim 9 including means for coupling said phase conjugate signal into a transmission line connected to said other array element and for coupling said incident signal of phase $\phi_1$ from said other element on said transmission line into said means for combining the output of said oscillator and said signal of phase $\phi_1$.

11. A circuit as defined in claim 10 including phase reference regeneration means and means at said other element for coupling said phase conjugate signal from said transmission line to said phase reference regeneration means and said other element, and for coupling said incident signal of phase $\phi_1$ from said other element to said transmission line and said phase reference regeneration means.

12. A circuit as defined in claim 11 wherein said phase reference regeneration means is comprised of separate means for dividing said conjugate signal phase $\phi^*_1$ by 2 and by n, and means for combining the quotients $\phi^*_1/2$, and means for combining said difference signal of phase $\phi_0 - \phi_1/2$ with said incident signal $\phi_1$ divided by an integer to obtain the reference signal $\phi_0$ as the sum of the phases of the signals combined.

13. A circuit as defined in claim 12 wherein said integer by which said incident signal is divided is equal to 4, and the quotient signal of phase $\phi_1/4$ is combined with said difference signal twice in two cascaded stages to thereby add $\phi_1/4$ to the difference signal twice for a total addition of phase equal to $\phi_1/2$ to the difference signal of phase $\phi_0 - \phi_1/2$.

14. An active retrodirective array for electronically pointing a microwave beam back in the direction of an incident beam at one frequency from a remote source, said array having a plurality of antenna elements spaced from each other for receiving said incident beam, all of said elements being effectively connected by transmission lines to one reference element which provides a reference phase, $\phi_0$, for distribution to all other elements, directly through separate phase conjugation means and diplexing means for a predetermined number of antenna elements at a first distribution level, and indirectly through phase conjugation means, diplexing means, and phase reference regeneration means for antenna elements at subsequent levels of distribution of the phase reference, $\phi_0$, each phase reference regeneration means providing a plurality of phase conjugation means with the reference, $\phi_0$, for phase conjugation of a signal at a second frequency transmitted from an element, thereby to electronically point the microwave beam transmitted from the array back to the source, each phase conjugation means for an antenna element comprising a voltage controlled oscillator in a phase locked loop, wherein said loop both conjugates the phase and translates the first frequency to the second frequency, said phase locked loop comprising means for mixing the output signal of said oscillator and a signal received from one array element connected to the phase conjugation means by a transmission line to obtain a sum signal whose frequency and phase is the sum of the signals mixed, means for dividing said sum by two, means for mixing the output signal of said divide-by-two means with a phase reference signal to obtain a difference signal whose frequency and phase is the difference between the signals mixed, means for dividing the output of said voltage controlled oscillator by an integer n, means for phase detecting said difference signal with the output of said divide-by-n means to obtain a phase error signal for control of said oscillator, thereby to produce a signal that is a conjugate of the signal received from said one array element, and means for coupling the output of said oscillator to said transmission line connecting said one array element to the phase conjugation means.

* * * * *